(12) United States Patent
Baumann

(10) Patent No.: US 9,974,316 B2
(45) Date of Patent: May 22, 2018

(54) RIB PAIRING DEVICE WITH A BALANCED BLADE HOLDER

(71) Applicant: BIAX Maschinen GmbH, Neuhausen am Rheinfall (CH)

(72) Inventor: Marco Baumann, Worblingen (DE)

(73) Assignee: BIAX Maschinen GmbH, Neuhausen am Rheinfall (CH)

(*) Notice: Subject to any disclaimer, the term of this patent is extended or adjusted under 35 U.S.C. 154(b) by 0 days. days.

(21) Appl. No.: 15/643,624

(22) Filed: Jul. 7, 2017

(65) Prior Publication Data

US 2018/0007920 A1  Jan. 11, 2018

(51) Int. Cl.
*A22B 5/00* (2006.01)

(52) U.S. Cl.
CPC .......... *A22B 5/0047* (2013.01); *A22B 5/0029* (2013.01)

(58) Field of Classification Search
CPC ....... A22B 5/00; A22B 5/0017; A22B 5/0029; A22B 5/0035; A22B 5/0041
USPC .......................................... 452/156-158, 173
See application file for complete search history.

(56) References Cited

U.S. PATENT DOCUMENTS

| | | | | |
|---|---|---|---|---|
| 3,546,737 A * | 12/1970 | Doerfer | ................ | A22B 5/0029 452/157 |
| 4,246,837 A * | 1/1981 | Chenery | .............. | A22C 17/008 452/134 |
| 4,300,263 A * | 11/1981 | Gotz | ...................... | A22C 25/14 452/67 |
| 5,226,850 A * | 7/1993 | Klaassen | ............ | A22C 17/0046 452/135 |
| 5,418,000 A * | 5/1995 | Marmer | .................. | A23L 17/00 426/479 |
| 5,902,177 A * | 5/1999 | Tessier | ............... | A22C 17/0046 452/156 |
| 6,358,135 B1* | 3/2002 | Post | ..................... | A22B 5/0017 452/153 |
| 6,547,658 B2* | 4/2003 | Boody | ................. | A22B 5/0035 452/134 |
| 8,096,860 B2* | 1/2012 | Bolte | ................... | A22C 17/002 452/157 |

(Continued)

FOREIGN PATENT DOCUMENTS

| | | |
|---|---|---|
| DE | 8908775 U1 | 9/1989 |
| DE | 102010013626 A1 | 10/2011 |
| EP | 1232839 A1 | 8/2002 |

(Continued)

OTHER PUBLICATIONS

European Office Action dated Nov. 7, 2017, Application No. 17175565.5, pp. 1-9.

*Primary Examiner* — Richard T Price, Jr.
(74) *Attorney, Agent, or Firm* — Bond Schoeneck & King, PLLC; George McGuire

(57) ABSTRACT

Presented is a rib paring device with a linear motion drive, that features a piston rod, that is flexibly guided in the rib paring device in a direction that is longitudinal to the stationary direction of the rib paring device, and that exercises a driving force on the piston rod in the stationary line of action of the rib paring device, the direction of which will change directions periodically, and with combination made up of a blade and a blade holder that features a proximal end and a distal end, the proximal end of which is detachably connected with the piston rod and the distal end of which is detachably connected with the blade.

15 Claims, 4 Drawing Sheets

(56) References Cited

U.S. PATENT DOCUMENTS 9,033,774 B2 * 5/2015 Taniguchi ............ A22C 17/004
　　　　　　　　　　　　　　　　　　　452/136

FOREIGN PATENT DOCUMENTS

| EP | 2243581 A1 | 10/2010 |
| WO | 9920424 A1 | 4/1999 |

* cited by examiner

RIB PAIRING DEVICE WITH A BALANCED BLADE HOLDER

CROSS-REFERENCE TO RELATED APPLICATIONS

This application relates and claims priority to German Application No. 102016112616.0, filed Jul. 8, 2016, the entire disclosure of which is incorporated herein by reference.

BACKGROUND OF THE INVENTION

This invention concerns a rib paring device.

Such a device is known in the market and features a linear motion drive operated with compressed air as the means of propulsion, which features a piston rod, which is flexibly guided in the rib paring device along a stationary direction that is longitudinal to the rib paring device. A hand tool with the linear motion drive is also known to the applicant from EP 2 243 581 A1.

In the device that is known in the market, the piston rod is connected with a compressed-air-driven piston that is movably mounted in a motor housing. A driving force is transferred to the piston rod with a line of force that is stationary with respect to the rib paring device. The direction of force periodically reverses, in such a manner that an oscillating translation motion results.

The device furthermore features a combination made up of a blade and a blade holder, that has a proximal end and a distal end. The proximal end of the blade holder is detachably connected to the drive element, and the distal end of the blade holder is detachably connected with the blade. The blade is bent in a U-shape and is employed in meat-handling operations for the purpose of freeing up ribs from slaughtered meat.

SUMMARY OF THE INVENTION

The rib paring device according to the invention differs from this state of the art by means of certain distinguishing features. The rib paring device according to the invention comprises the combination made up of blade holder and blade lies in a departure with the stationary line of action in reference to the rib paring device.

By means of these features it is assured that the main focus of the blade holders that are oscillating during operation of the rib paring device, only experience translational operating forces. In the event in which the main focus of the combination made up of the blade holder and blade, on the other hand, lies outside of the line of action of the driving force, then the driving force additionally produces loading torque or tilting torque in a direction that is longitudinal to the direction of the driving force bearing of the blade holders and the piston rod. As an undesired consequence, major wear of this bearing occurs. Furthermore, noticeable vibrations have been observed in known rib pullers. Vibrations impact the down time of tooling since they can lead to fatigue fractures in highly stressed points. Beyond this, vibrations can lead to bolts loosening up, for example bolts with which the blade is attached. During the operation of the device, the tilting torque is transferred to the operator, in particular to its upper extremities, which complicates the operation and which leads to premature fatigue of the operator. These disadvantages are effectively avoided with the device according to invention.

Further advantages can be deduced from the dependent claims, the description and the attached mosaics.

It is to be understood that the aforementioned features, as well as the yet to be discussed features can be used in the respectively given combination as well as also in other combinations, or alone, without going beyond the scope of this invention.

Execution examples of the invention are represented in the mosaics and will be discussed in more detail in the following description. In the mosaics, the same reference signs that appear in multiple mosaics respectively refer to like elements or at least to elements that are comparable as regards their function. Schematically, the following respectively show:

DETAILED DESCRIPTION

Figure 1:
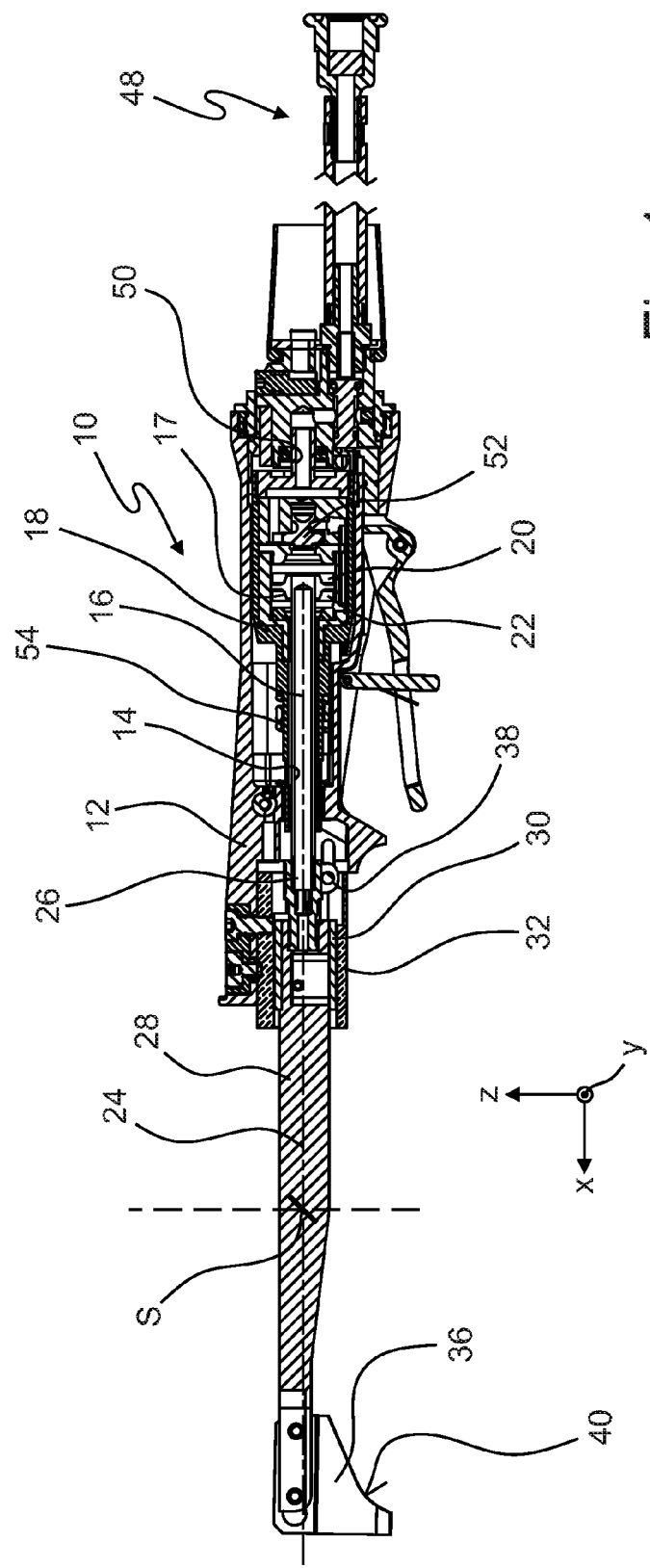
FIG. 1 a longitudinal section of an execution example of a rib paring device according to the invention.

FIG. 1 specifically shows a longitudinal section of an execution example of a rib paring device 10 according to the invention with handle body 12 and piston rod 14, which is movably arranged along an axis 16 in the handle body 12.

The piston rod 14 is rigidly connected with a piston 17, that is arranged in a motor housing 18 within the handle body 12 in the direction of the axis 16 and that separates a first working space 20 from a second working space 22 of the motor housing 18 from one another in a movable manner. Each of the two working spaces 20, 22, when considered alone, are alternatively filled with and vented of compressed air, whereby the filling of the two working spaces 20, 22 takes place in an alternating manner between the two.

Upon filling of the first working space 20, a resulting compressive force is created on the piston 16, with which the piston rod 14 is driven out of the handle body 12. Upon filling of the second working space 22 with compressed air, on the other hand, the piston rod 14 is drawn into the handle body. The motor housing 18 with the piston 17 that moves back and forth under the influence of the compressed air and the thereto solidly coupled piston rod 14 thereby constitutes a linear motion drive. The axis 16 is preferably an axis of symmetry of the preferable rotationally symmetrical piston rod 14.

FIG. 1 thereby, in particular shows a rib paring device 10 with a piston rod 14, which is flexibly guided in the rib paring device 10 along a direction that is stationary in relation to the rib paring device 10, namely in the direction of the axis 16. FIG. 1 furthermore shows a linear motion drive, which exercises a driving force on the piston rod 14 in relation to the stationary line of action 24 of the rib paring device 10, the direction of which switches out periodically. The line of action 24 thereby coincides in the shown execution example with the rotational axis of symmetry 16 of the piston rod 14.

A distal end 26 of the piston rod 14, that protrudes out of the motor housing, serves for the connection of a blade holder 28. In the case of a device that is operationally ready, a proximal end of the blade holder 28 is frictionally and detachably connected with the distal end 26 of the piston rod 14 with clamp 38.

The blade holder 28 features an exchangeable first guide sleeve 30 on its proximal end. On the end that accepts the blade holder 28, the handle piece 12 features a further detachable guide sleeve 32, which is attached in a fixed but detachable manner in the handle piece 12.

The detachable connection takes place, for example, by means of a bolt 34, which penetrates through a wall of the handle piece 12 into a thread of the further guide sleeve 32 and tensions the further guide sleeve 32 with the wall. The internal surface of the further guide sleeve 32 creates a storage space, upon which the outer surface of the first guide sleeve 30 that is connected to the blade holder 28 is translationally stored in a movable manner and thereby is supported longitudinally to the translation direction indicating directions.

On its distal end, the blade holder 28 features a detachably connected blade 36. The detachable connection preferably occurs by means of bolts.

The combination made up of the blade holder 28 and the blade 36 distinguishes itself by the fact that main focus S of the combination made up of blade holder 28 and blade 36 lies in the departure, as regards the rib paring device, from the stationary line of action 24, which coincides with the axis of symmetry 16 of the rotational symmetry of the piston rod 14. It is possible to consider the line of action 24 as being the perpendicular of an imaginary surface, which lies parallel to the y-z plane (which is to say, longitudinal to the plane of the image) in the directions that are indicated in FIG. 1, the origin of which coincides with its intersection with the line of action 24. Then the main focus S of the combination made up of blade holder 28 and blade 36 will also lie in this intersection. In this, the blade holder 28 will also comprise the clamp 38 and the first guide sleeve 30, inasmuch as the same are included amongst the translationally oscillating moving parts.

Figure 2:
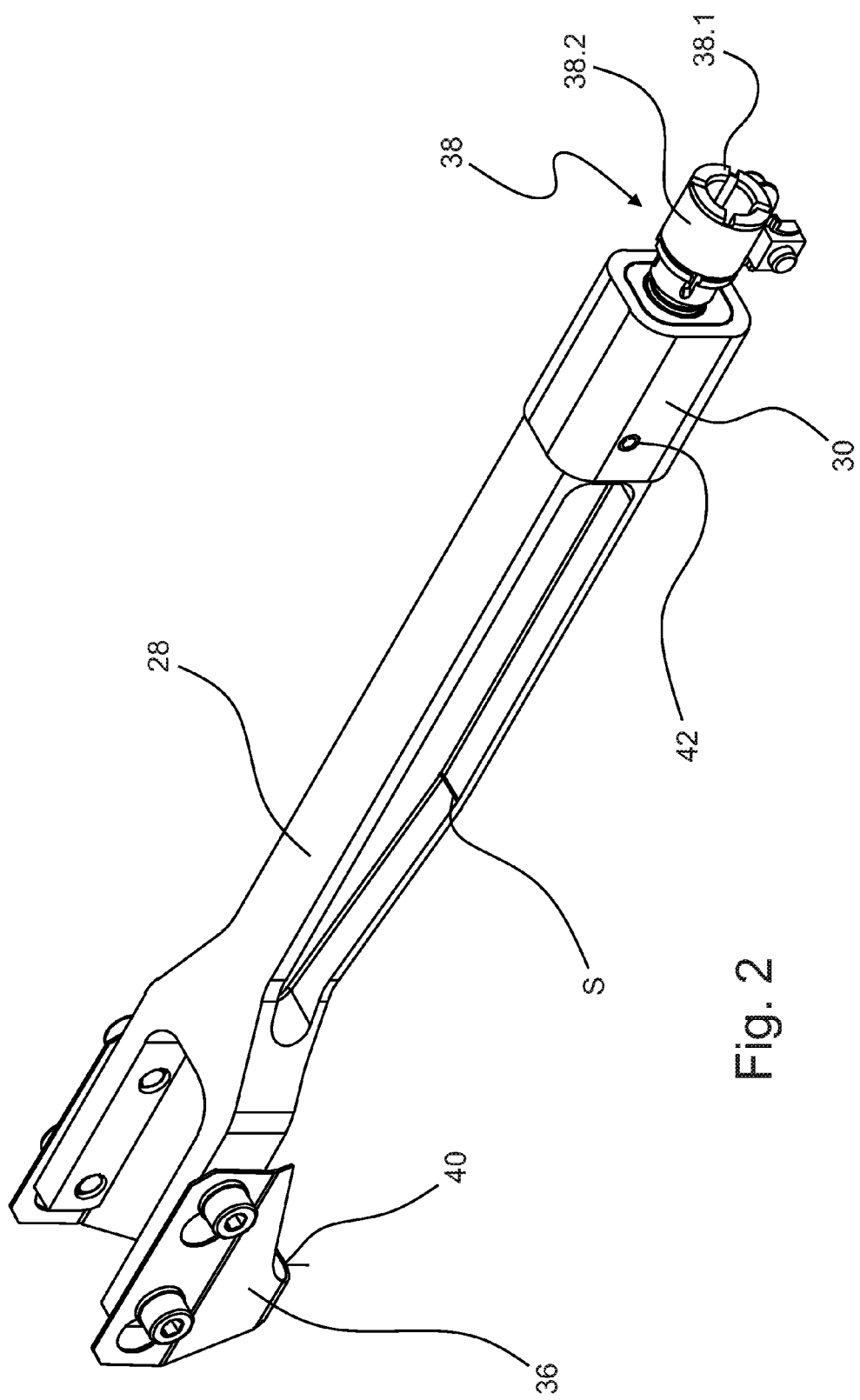
FIG. 2 a blade holder with blade and clamp in an oblique view.

FIG. 2 shows the blade holder 28 with blade 36 and clamp 38 in an oblique view. The blade holder is executed at its distal end in a U-shape, or alternatively in a forked shape. The legs of the U-shape are used for the attachment of an arched blade 36 that spans the distance between the two legs in an arched manner and the cutting edge 40 of which faces the handle piece 12. The device 10 is therefore equipped for a pulling cutting motion.

The blade holder 28 features the previously named first guide sleeve 30 at its proximal end. This first guide sleeve 30 is preferably interlockingly attachable on the proximal end of the blade holder 28. The first guide sleeve 30 is preferably attachable with a roll pin 42 to the blade holder 28. During operation of the device 10, the first guide sleeve 30 slides back and forth in the further guide sleeve 32 and hereby serves to bear and guide the translational oscillating motion of the blade holder 28. The first guide sleeve 30 is thereby a component that can be separated from the blade holder 28 and in the event of wear it can be switched out. It preferably consists of a synthetic material that is appropriate as regards the required hygiene for slide bearing.

Beyond this, the blade holder 28 features a shape that is interlockingly attached at its proximal end with a clamp sleeve 38 with clamp 38.1. The clamp sleeve serves the purpose of a detachable connection of the blade holders 28 with the distal end of the piston rod 14. In a preferred embodiment, at its proximal end, the blade holder 28 features a blind hole, extending in the direction of the translation movement, provided with female threading, for interlocking acceptance and attachment of clamp sleeve 38. The clamp sleeve 38 features a first end with matching male threading and a second opposing facing end, that is designed as a clamp sleeve. The clamp sleeve features notches 38.1 that extend in a radial direction and which are distributed around its circumference. The clear span of the clamp sleeve corresponds to the outer diameter of the distal end of the piston rod 14 and accommodates the distal end of the piston rod 14 in the operationally ready state of the device 10. A clamp 38.2 fitted with a turnbuckle, which encompasses the circumference of the clamp sleeve in the area of the notches 38.1, is used for the positive connection of the distal end of the piston rod 14 in the clamp sleeve.

The blade holder 28 preferably has a double-T profile between its distal end and its proximal end. The minimal total weight that is desirable for operations is thereby achieved with contemporaneous elevated stiffness, which is beneficial for a long-lasting lifetime of the blade holder 28.

Figure 3:
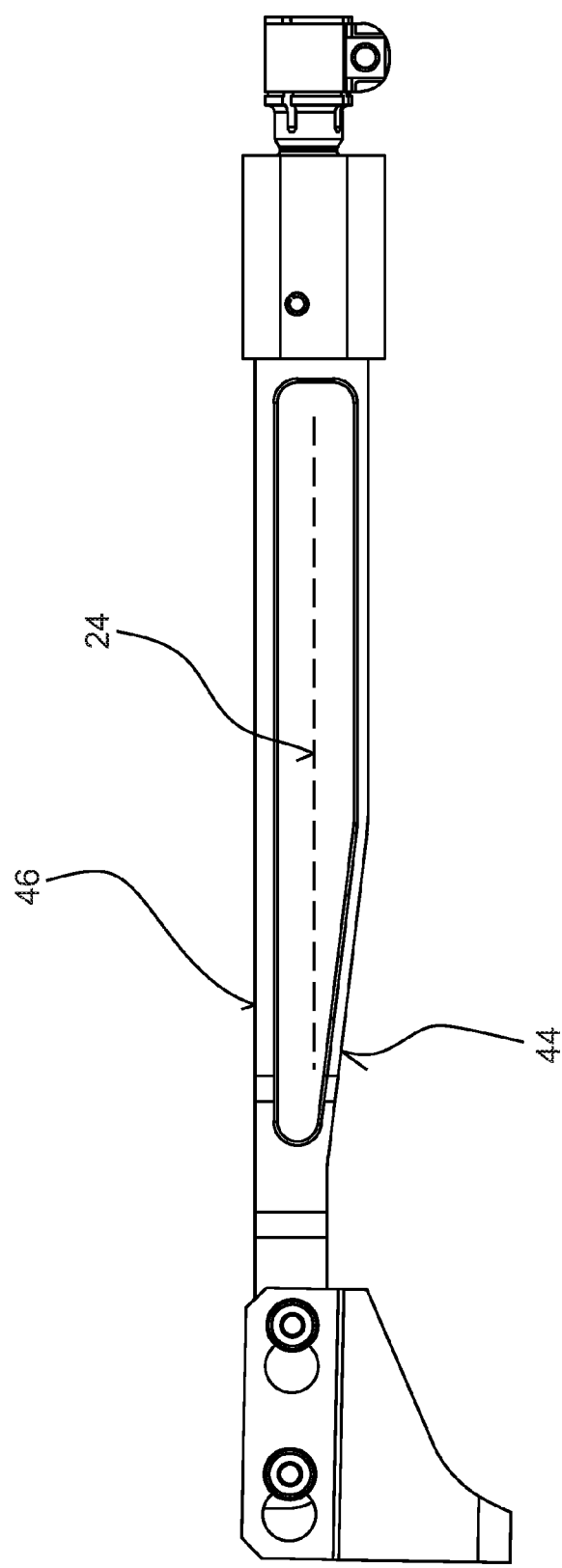
FIG. 3 the blade holder with first guide sleeve, clamp and blade in a side view.

FIG. 3 shows the blade holder 28 with the first guide sleeve 30, clamp sleeve 38 and blade 36 in side view. The main focus S of the blade holder 28 that is connected with these elements lies in the line of action 24 in FIG. 1. The blade holder 28 features a first side 44 that faces the blade 36 (cf. FIG. 3) and a second side 46 that is reversed and is opposite to the first side 44. The distance between the first side 44 and the line of action 24 decreases with increasing distance from its proximal end that faces the handle piece 12. This ensures sufficient free space or cross-section between the blade and the blade holder for the ribs during use as a rib paring device.

Figure 4:
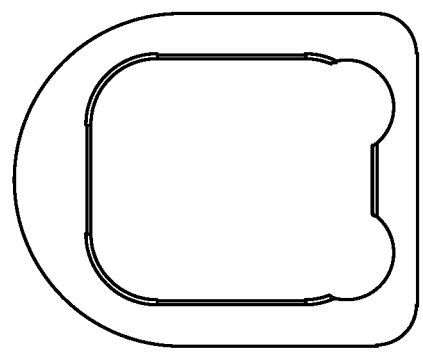
FIG. 4 a front view of a second guide sleeve.

FIG. 4 shows a front view of the second guide sleeve 32 with the clear span that is used to accept the first guide sleeve. In a first approximation, the cross-section corresponds to a square with rounded off corners. The free grooves in the bottom of FIG. 4 enable the pushing through of the clamp screw, which lies longitudinal to the opening, as well as of the clamp.

Figure 5:
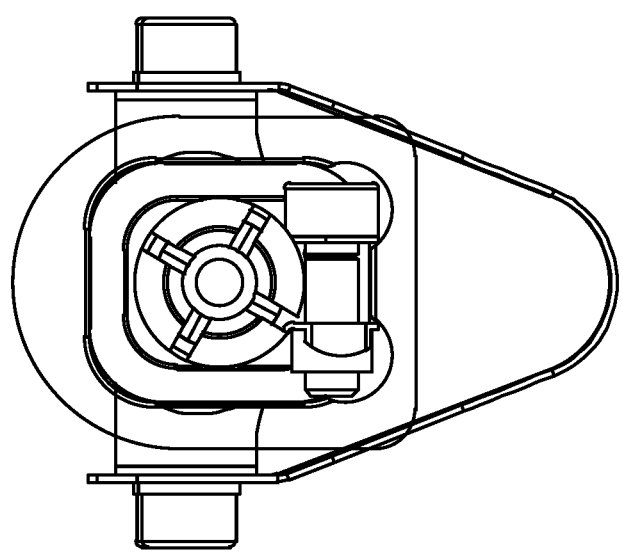
FIG. 5 a view of the proximal end of the blade holders with the blade, first guide sleeve and second guide sleeve.

FIG. 5 shows a view of the blade holder with blade, first guide sleeve and second guide sleeve taken from a point of view that corresponds to the x-direction in FIG. 1.

The rib paring device 10 features a compressed air connection 26 with a pressurized air control valve, through which a stream of pressurized air can be guided in the working spaces 20, 22. The pressurized air control valve 28 is operated by an operational instrument of the hand tool 10. In the embodiment depicted, the operational instrument is a manually-operated knee lever.

Going forward, reference will once again be made to FIG. 1. Compressed air enters into the motor housing 18 by means of the compressed air connection 48 of device 10 and compressed air connection piece 50 of the motor housing 18 and depending on the setting of a control valve 52, flows either in the first working space 20 or in the second working space 22. The piston 17 features both a first piston skirt that directs to the first working space 20 as well as also a second piston skirt that directs to the second working space 22.

The motor housing 18 is arranged in an elastically mobile manner in the movement direction of the piston 17 in the handle body 12 of the device 10. This manner of arrangement allows for a subsequently occurring oscillation of the motor housing 18 that contrasts with the oscillation of the piston 17, which contributes to a desired cancellation of the forces of inertia.

A compressive force works upon the diameter of the pressure connection piece 50 within its control, which shifts the motor housing 18 against the force of an elastic return element, for example a spiral spring 54 represented in FIG. 1. The forces further reinforce the compressive forces inside the working spaces 20, 22. These compressive forces respectively drive the motor housing 18 in the direction opposite to the direction of the piston driving force. As a desirable consequence, the motor housing 18 and piston 17 move in contrasting directions, which already leads to a good cancellation of the oscillations and thereby to manageability of the overall rib paring device 10.

Each piston skirt, together with the corresponding piston head creates a piston pot so that the piston exhibits in total two rigidly connected piston pots that are opened to opposing sides.

Each piston pot features a cylinder-shaped sleeve in the form of its piston skirt, a pot bottom and a pot opening that is opposite to the pot bottom. The pot bottoms of the two piston pots exhibit a set distance from one another and are arranged between the pot openings, so that the piston pots open in opposing directions.

What is claimed is:

1. Rib paring device with a linear oscillating drive, which exhibits a piston rod, which is flexibly guided in the rib paring device along a stationary direction that is longitudinal to the rib paring device, and which exercises a driving force on the piston rod in relationship to the stationary line of action of the rib paring device, said piston rod moves back and forth in a periodical direction, and said piston rod is connected with a combination made up of a blade and a blade holder that features a proximal end and a distal end, the proximal end of which is detachably connected with the piston rod and the distal end of which is connected with the blade, additionally the blade holder and blade lie in alignment with the stationary line of action in reference to the rib paring device.

2. Rib paring device according to claim 1, comprising a distal end of the piston rod protruding out of a motor housing and used for attachment of the blade holder.

3. Rib paring device according to claim 1 wherein a proximal end of the blade holder is frictionally and detachably connected with the distal end of the piston rode with a clamp sleeve.

4. Rib paring device according to claim 1, characterized by the fact that the blade holder features a first exchangeable guide sleeve on its proximal end.

5. Rib paring device according to claim 4, wherein the first guide sleeve is a component that can be separated from the blade holder and in the event of wear can be switched out.

6. Rib paring device according to claim 5, wherein the first guide sleeve consists of a synthetic material that is appropriate as regards the required hygiene for slide bearing.

7. Rib paring device according to claim 6, wherein a handle piece of the rib paring devices features an exchangeable further guide sleeve on its blade holder accepting end, that is stationary in the handle piece, but detachably attached.

8. Rib paring device according to claim 7, wherein the inner surface of the further guide sleeve creates a storage surface, on which the outer surface of the first guide sleeve that is connected to the blade holder is translationally stored in a movable manner and thereby is supported longitudinally to the translation direction indicating directions.

9. Rib paring device according to claim 8, wherein the first guide sleeve is interlockingly attachable on the proximal end of the blade holder, is attachable with a roll pin to the blade holder, during operation of which the device slides back and forth in the further guide sleeve and hereby serves the bearing and the guidance of the translational oscillating motion of the blade holder.

10. Rib paring device according to claim 9, wherein the piston rod features a rotational axis of symmetry, that runs between the piston and the distal end of the piston rod and that the stationary line of action in reference to the rib paring device coincides with the rotational axis of symmetry of the rotational symmetry of the piston rod.

11. Rib paring device according to claim 1, wherein the blade holder is executed at its distal end in a U-shape, or alternatively in a forked-shape, whereby the legs of the U-shape are used for the attachment of an arched blade, that spans the distance between the two legs in an arched manner and the cutting edge of which faces the handle piece.

12. Rib paring device according to claim 1, wherein the blade holder features a clamp sleeve that is interlockingly attached with its proximal end.

13. Rib paring device according to claim 1, wherein the blade holder possesses a double-T profile between its distal end and its proximal end.

14. Rib paring device according to claim 1, wherein the blade holder features a first side that faces the blade and a second side that is reversed and is opposite to the first side and that the distance between the first side and the line of action decreases with increasing distance from proximal end of the blade holder that facing the handle piece.

15. Rib paring device according to claim 1, wherein the cross-section of a clear span of the second guide sleeve that serves to accept the first guide sleeve is a square with rounded off corners.

\* \* \* \* \*

UNITED STATES PATENT AND TRADEMARK OFFICE
CERTIFICATE OF CORRECTION

PATENT NO.           : 9,974,316 B2
APPLICATION NO.      : 15/643624
DATED                : May 22, 2018
INVENTOR(S)          : Marco Baumann Page 1 of 1

It is certified that error appears in the above-identified patent and that said Letters Patent is hereby corrected as shown below:

In the Specification

Column 5, Line 41, please delete the word "rode" and insert the word --rod--

Signed and Sealed this
Thirteenth Day of November, 2018

Andrei Iancu
*Director of the United States Patent and Trademark Office*